April 5, 1960 H. L. MILLS 2,931,967
ALTERNATING CURRENT WELDING TRANSFORMER
Filed April 18, 1957 5 Sheets-Sheet 2

INVENTOR.
HENRY LAURENCE MILLS
BY Ralph L. Dugger
ATTORNEY

April 5, 1960 H. L. MILLS 2,931,967
ALTERNATING CURRENT WELDING TRANSFORMER
Filed April 18, 1957 5 Sheets-Sheet 3

FIG. 5

INVENTOR.
HENRY LAURENCE MILLS
BY Ralph L. Dugger
ATTORNEY

April 5, 1960

H. L. MILLS 2,931,967

ALTERNATING CURRENT WELDING TRANSFORMER

Filed April 18, 1957

INVENTOR.
HENRY LAURENCE MILLS
BY Ralph L. Dugger
ATTORNEY

April 5, 1960 H. L. MILLS 2,931,967
ALTERNATING CURRENT WELDING TRANSFORMER
Filed April 18, 1957 5 Sheets-Sheet 5

FIG. 7

INVENTOR.
HENRY LAURENCE MILLS
BY Ralph L. Dugger
ATTORNEY

United States Patent Office 2,931,967
Patented Apr. 5, 1960

2,931,967

ALTERNATING CURRENT WELDING TRANSFORMER

Henry Laurence Mills, Excelsior, Minn.

Application April 18, 1957, Serial No. 653,693

2 Claims. (Cl. 323—51)

This invention relates to the art of arc welders and more particularly to that segment of the art which has to do with alternating current arc welding transformers. Arc welding transformers heretofore available have usually been designed to use a ballast resistor in the secondary circuit so as to permit adequate stabilization of the arc during welding. Welding transformers for commercial service must be so constructed as to deliver a wide range of welding currents in the secondary ranging from as low as twenty amperes on up to two or three or four hundred amperes for heavy service. Some of the transformer designs have provided relatively high reactance so as to provide all or part of the ballast effect requisite to arc stabilization but such designs are undesirable in other respects in that the transformer operates at low power factor and is unduly large, bulky, and requires excessive amounts of materials.

A further requirement for arc welders is that regardless of the setting in respect to output amperage in the secondary second, it is desirable, when using certain kinds of welding rods particularly, to have a relatively high open circuit secondary voltage to assist in striking the arc. Welding transformers heretofore available while capable of providing such high open circuit voltage for certain welding current settings have nevertheless been deficient in this respect in that, at other secondary settings, the transformer welding apparatus failed to provide the desired high open circuit secondary voltage.

It is an object of the present invention to provide an improved arc welding transformer, and more particularly to provide an improved arc welding transformer capable of delivering a wide range of output currents in the secondary while at the same time being capable of delivering a high open circuit voltage at the secondary terminals for striking the arc. It is another object of the invention to provide an improved welding transformer apparatus of relatively light weight for the output of the machine and which is capable of operating at favorably high power factors throughout a large and effective range of welding current outputs of the machine. It is another object of the invent to provide an improved welding transformer circuit and system capable of affording the aforesaid results. Other and further objects of the invention are those inherent in the apparatus herein illustrated, described and claimed.

The invention is illustrated with reference to the drawings in which:

In Figure 1 the circuits are shown schematically. Figure 2 is likewise a side elevational view partly in section and in it circuits are shown schematically. Figures 4, 5, 6, and 7 illustrate a preferred form of mechanical construction and electrical arrangement of the present invention. In these figures.

Figure 1:
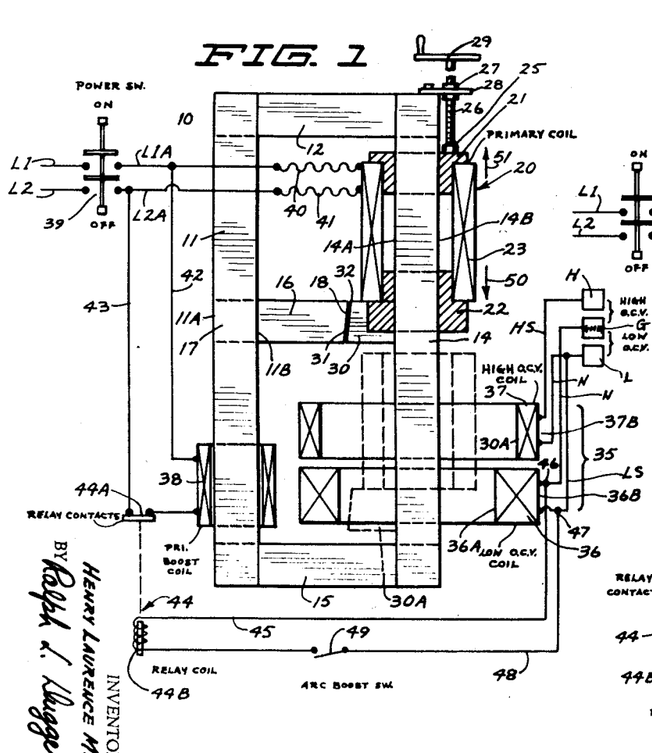
Figure 1 is a simplified view of one form of the invention, this view being a side elevational view, as the apparatus is generally considered.

Referring to Figure 1 the apparatus of the present invention therein illustrated, partially in schematic form, comprises an electro-mechanical arrangement wherein there is provided a main magnetic circuit generally designated 10 for the transformer. In its principal embodiment the magnetic circuit forms a rectangular frame in which at the left as shown in Figure 1 there is a vertical leg 11 which is connected by the horizontal top leg 12 to a right vertical leg 14 of the transformer which is in turn connected by the lower horizontal leg 15 to the bottom of the left leg 11. These four legs of the transformer main magnetic circuit 10 are in the shape of a rectangle which is higher than it is wide. It will be understood of course that the transformer may be placed so that the rectangular transformer core or magnetic circuit 10 is arranged vertically as shown in Figure 1, or it may be placed in any position desired such as with its major dimension horizontal. The rectangular magnetic core 10 has at approximately the center position a shunting magnetic circuit composed of the leg 16 which is connected at 17 to the left leg 11 and a piece 30 attached to the primary coil mechanism 20. The leg 16 preferably terminates at a beveled surface 18.

The entire core 10—16—30 is made up of thin sheets of transformer core stock such as silicon steel. The thin sheets are cut in rectangular pieces and are stacked one on top of the other in the usual overlapping manner at the corners until the requisite thickness of dimension is provided. At the junction 17 between the shunting leg 16 and the leg 11 the shunting leg is preferably connected by running some of the laminations entirely through to the edge 11A with some of the laminations being stopped at the edge 11B. In this way there is interweaving of the laminations of the leg 16 and 11 so as to form a strong mechanical joint. Also in laying the laminations forming the legs 11, 12, 14 and 15 overlapping is made in alternate directions at the corners on successive laminations so as to form a strong mechanical arrangement.

The leg 14 serves not only as a magnetic circuit for the transformer but also as a mechanical support upon which the primary structure generally designated 20 is adapted to move up and down. The laminations in the leg 14 extend from the upper leg 12 to the lower leg 15. The laminations are of course fastened together by bolts or clamps in any suitable clamping arrangement and thus form a strong support having a cross section which is rectangular. The surfaces 14A and 14B of the leg 18 are actually composed of the edges of the laminations and since the laminations may not be precisely accurate dimensionally or otherwise smoothed off, they will form a slight ridge extending all the way from the top to the bottom on surfaces 14A and 14B. The laminations are preferably stacked as evenly as possible and unless some of the laminations project excessively they need not be smoothed off.

Figure 6:
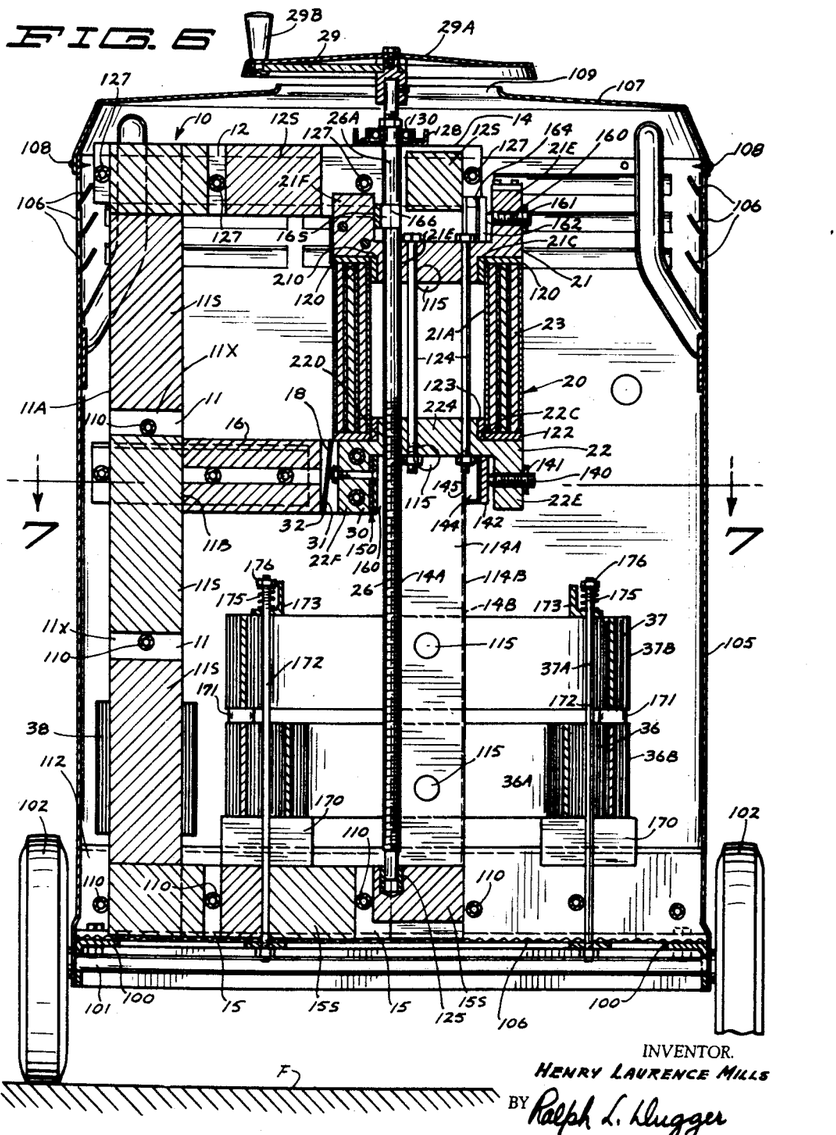
Figure 6 is a vertical sectional view taken along the line and in the direction of arrows 6—6 of Figure 5.

The leg 14 is, in effect, a rectangular post, and advantage is taken of this by using it as a vertical slide upon which mechanical slider blocks 21 at the top and 22 at the bottom are mounted. These are fastened together by bolts, as shown in Figure 6 and they serve as a slider which mechanically slides on the leg 14 from an upper position as shown in full lines to a lower position. The blocks 21 and 22 serve as a support for the primary winding 23 of the primary coil assembly 20. Any suitable mechanical arrangement not illustrated may be used for holding the assembly 21, 22—23 together.

Connected to the assembly 20 by means of a thrust bearing 25 is the bottom end of the screw 26 which passes through the threaded block 27 on the frame 28. The upper end of the screw 26 is provided with a crank handle at 29 by means of which it may be rotated in either direction. In this way the primary winding assembly 20 may be adjusted up and down and in this manner the coil 23 may be moved to any selected position from the upper position shown in full lines to the lower position shown in dotted lines.

Upon the lower mechanical support 22 of the assembly 20 there is mounted the core element 30 previously referred to. It is composed of a plurality of laminations of transformer core steel stacked together and taken with the leg 16 forms the shunting magnetic circuit. The laminations composing stack 30 are mechanically supported from the lower frame member 22 of the arrangement 20. The laminations 30 are stacked so as to provide the same thickness as the core, particularly core segment 16, of the shunting arrangement. Also the core element 30 is provided with a beveled surface at 31 which matches the beveled surface 18 of the core element 16. When the screw 26 is rotated so as to pull the primary arrangement 20 to its most elevated position the two beveled surfaces 18 and 31 are brought into close proximity so as to reduce the reluctance of the shunt 16—30. In this position the shunt has a maximum effectiveness. As the primary arrangement 20 is moved down, a greater air gap is provided in space 32 and this increases the reluctance of the shunt 16—30 and reduces its magnetic shunting effect.

Lower down upon the leg 14 of the magnetic circuit there is mounted a secondary shown opposite the bracket 35. The secondary 35 is composed of a lower pancake winding at 36 and an upper pancake winding at 37. These are both wound with spacings between turns and layers and are mechanically supported from the core 10 by structural means not shown. It will be noted that the two pancake windings 36 and 37 are separated by a slight space which enhances ventilation and the degree of vertical spacing between windings permits some variation in reactance. The lower winding 36, which is designated "Low O.C.V. Coil," (for "Low Open Circuit Voltage"), contains the greater number of turns and has an internal diameter at surface 36A and an outer diameter at surface 36B. The winding 37 which is designated "High O.C.V. Secondary Coil" (for "High Open Circuit Voltage"), has an inner diameter at surface 37A and an outer diameter at surface 37B. The more elevated position of coil 37 permits the induction therein of higher open circuit voltages, when the primary coil 20 is lowered to the position shown in dotted line, for lower (secondary amperage), than occurs in coil 36 under the same conditions.

The coil 36 is connected by the lines LS and N to the terminals L and N respectively and the coil 37 is connected by the lines HS and N to the terminals H and N respectively. The terminal N may be regarded as "neutral" or "ground."

Upon the leg 11 of the main magnetic circuit 10 and substantially opposite the lower secondary winding 36 there is mounted a "Primary Boost Coil" 38, which is mechanically supported from the core structure by bracing, not shown.

Primary supply voltage is provided by lines L1 and L2, the supply being controlled by a push button On-Off switch 39, which therefore controls the application of power to supply lines L1A and L2A of the transformer circuits. The lines L1A and L2A are connected by the flexible leads 40 and 41, respectively, to the coil 20 of the primary, the flexible leads thus permitting the coil to be adjusted mechanically in relation to the secondary coils 36 and 37 which are fixedly supported. From the lines L1A and L2A leads 42 and 43 respectively extend to the coil 38, the line 43 being taken through the contacts 44A of the relay 44. The coil 44B of the relay 44 is connected to the lines 45 to terminal 46 on line N of the secondary output circuit and from terminals 47 on the secondary circuit LS the line 48 extends thru a manual control switch 49 to the relay coil 44B.

Figure 3:
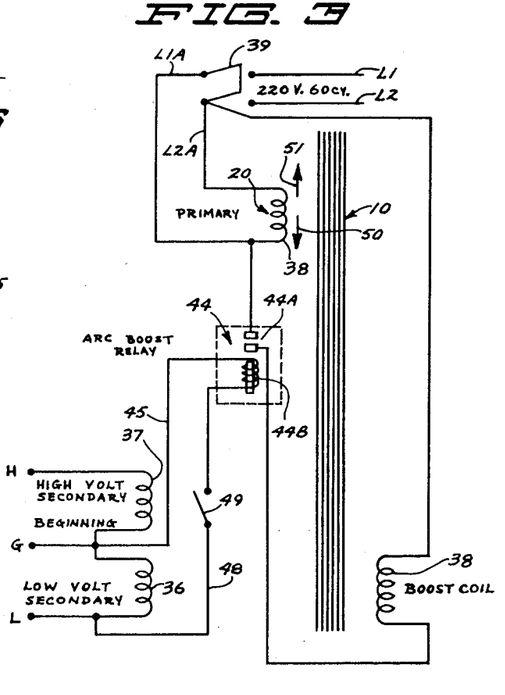
Figure 3 is a wiring diagram of the welding apparatus of the present invention.

A simplified wiring diagram of the transformer arrangement is shown in Figure 3.

With reference to Figures 1 and 3, when the primary coil 20 is in the position shown in full lines in Figure 1, the shunt 16—30 is in a position such that the spacing 32 between the surfaces 18 and 31 is a minimum, and hence the shunt has a maximum effectiveness, most of the magnetic flux produced by the primary 20 being thus shunted through a circuit composed of the upper portion of leg 11, leg 12, the upper portion of leg 14 thence across the shunt 30—16. Depending upon the thickness of the airgap 32 and the reluctance otherwise provided in the shunting leg, some fraction of the magnetic flux will continue down through the lower portion of the leg 14 hence via legs 15 and the lower portions of leg 11 back to the junction 17. Some leakage will, of course, occur thru portions of windings 36 and 37. In this way the secondary coils 36 and 37 are to some extent included in the magnetic circuit even when the shunt 16—30 is at the setting of maximum effectiveness. In the event switch 49 is closed, the voltage produced in the coil 36 will cause the energization of coil 44B thus lifting its contacts 44A, and accordingly energizing the coil 38. This coil 38 is connected so that its magnetomotive force is in additive relationship to that of coil 23, and consequently when a voltage across junctions 46 and 47 (which is the same as across the terminals G and L of the secondary output) is sufficient, coil 44B will be maintained energized and the primary booster coil 38 will continue to be energized. However when the secondary terminals G and L are connected to their customary welding load the welding current flowing in the secondary circuit 36 will sufficiently reduce the voltage across the terminals G and L, (and hence also across the junctions 46 and 47), so as to reduce the applied voltage upon coil 44B to an amount insufficient to maintain the relay 44 energized and it drops out thereby opening the contacts 44A thus de-energizing the coil 38. Accordingly by this arrangement a relatively much higher open circuit voltage is provided across the terminals G and L when no welding current is flowing than is maintained during the welding operation. After the relay 44 has become de-energized the only flux reaching the coils 36 and 37 is that produced by the coil 20.

When handle 29 is rotated appropriately coil 20 will be moved downwardly in the direction of arrow 51, the lowermost position being shown in dotted lines Figure 1. In so moving, the air gap 32 between the faces 18 and 31 in the shunting circuit is progressively increased and accordingly at each successively lower position the proportion of magnetic flux which traverses the full magnetic circuit increases and the proportion which traverses the shunting circuit 16—30 decreases. Also as the coil 20 is moved toward its lowermost position the degree of coupling with coils 36 and 37 is increased to a maximum when in the dotted line position, shown in Figure 1.

A relatively low open circuit voltage for welding operations is provided at terminals G and L, whereas when a relatively high circuit voltage is desired, the welder makes the connection to the terminals G and H. With some welding rods, particularly, it is easier to initiate the arc when a high open circuit voltage is used. Regardless of whether the terminals G and L are used however, the voltage across the junctions 46 and 47 may be used as a control by means of which the operation of the primary booster coil 38 is controlled. The reason for this is that even though no load may be drawn from the coil 36, as when the welder has his ground and active electrode connected to terminals G and H respectively, still during the welding operation when welding current is flowing a voltage reduction occurs in the coil 36 even though no load is flowing through it, as compared to the voltage induced in such coil when no secondary current is being drawn from the coil 37.

Figure 2:
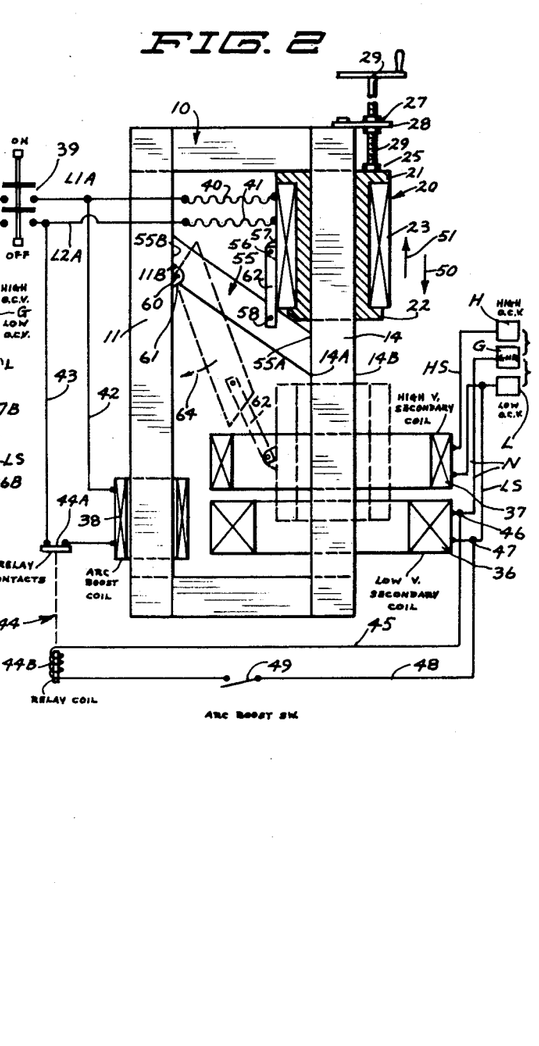
Figure 2 is another view similar to that shown in Figure 1 and shows another form of welding apparatus of the present invention.

Referring to Figure 2, the arrangement there shown is similar to that shown in Figure 1 except that the form of magnetic shunt which in Figure 1 is shown is composed of the components 16 and 30, in Figure 2 it is replaced by the shunt generally designated 55. Shunt 55 is composed of a stack of laminations having a length such that it is somewhat longer than the space between the inner surfaces 11B and 14A of the main magnetic circuit. The ends of the stack 55 of the laminations are beveled at surfaces 55A and 55B so as to contact respectively with the surfaces 14A of the main magnetic circuit leg 14 and the surface 11B of the main magnetic circuit leg 11. The entire stack of shunting laminations 55 is supported on a pivot at 60 mounted upon the suitable mechanical support 61 carried upon the magnetic circuit 10 and the magnetic shunt is thus free to swing downwardly from the position shown in full lines to the position shown in dotted lines, in Figure 2. From the primary arrangement 20, which is movable up and down as shown by the arrows 51, there is a mechanical support 57 connected by a pivot 56 and a link 62 to a pivot 58 on the magnetic shunt 55. When the primary arrangement 20 is in its uppermost position as shown in Figure 2 the magnetic shunt 55 is swung upwardly until the faces 55B and 55A contact respectively the faces 14A and 11B of the main magnetic circuit thus making the shunt of maximum effectiveness. If desired air gaps may be provided at 55A and 55B by fastening pieces of material non-magnetic sheeting such as rubber between the surfaces 14A and 55A and between the surfaces 11B and 55B. Such material, being of non-magnetic properties in effect introduces air gaps into the magnetic circuit of the shunt. As the primary winding arrangement 20 is lowered, by rotation of the screw 26, the shunt is swung down and it assumes some position such as shown in dotted lines. In the lowermost position the shunt 55 and the link 62 act as a stretcher suspension which determines the lowermost position to which the primary winding arrangement 20 can be lowered. Then as the primary winding arrangement 20 is again elevated the link 62 will first push the shunt 55 in the direction of the arrow 64 until the linkage 62 is free again to swing upwardly and it then drawn the shunt 55 upwardly after which it is then elevated to the position as shown in full lines. In this way, variation in the shunting effect may be achieved, equivalent to that shown in Figure 1.

Figure 7:
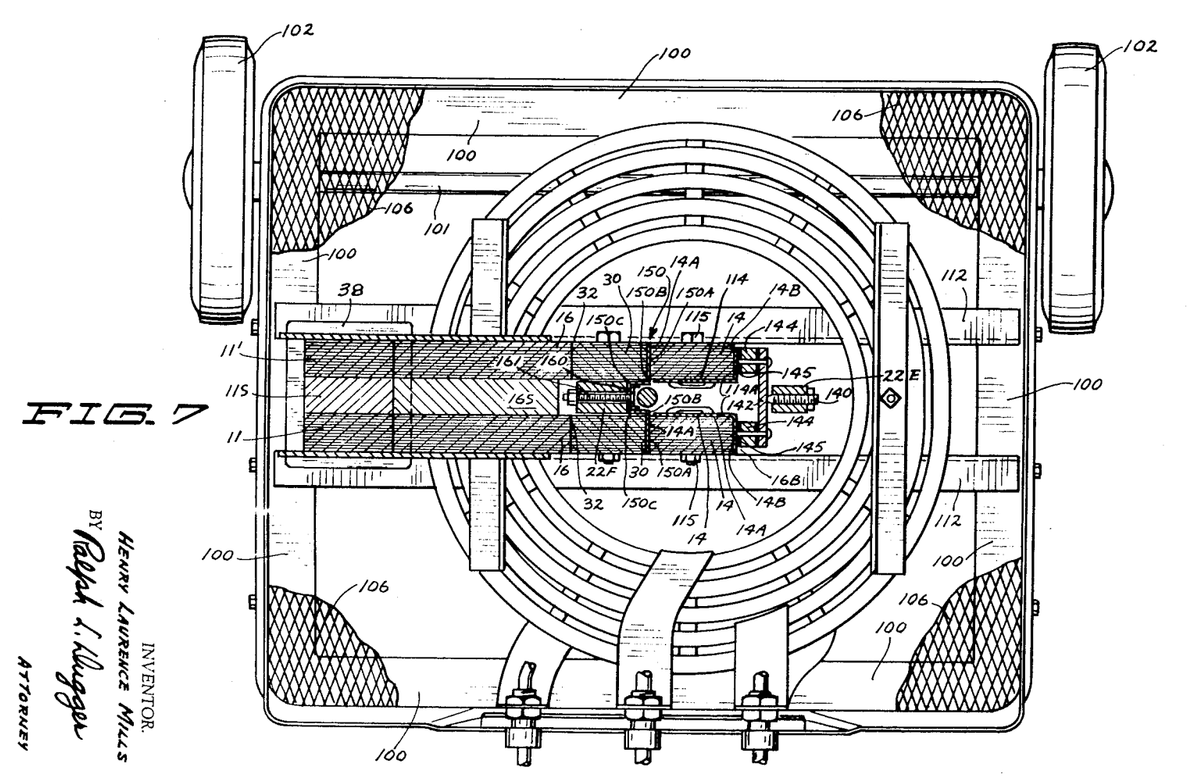
Figure 7 is a further horizontal sectional view taken along the line and in the direction of arrows 7—7 of Figure 6.

Reference is now made to Figures 4–7 in which there is illustrated a preferred embodiment of the invention. In this illustration of the invention there is provided a sturdy sub-frame 100 which is preferably mounted upon an axle 101 having wheels 102 thereon. The wheels provide support at one side of the base frame and legs 103 are provided at another portion of the base frame, so as to provide stability. A handle 178 attached to the frame facilitates movement. Upon the frame there is a housing 105. The bottom of the frame is composed of expanded metal 106, and since the housing is raised up above the floor F by the wheels 102 and legs 103, ventilation is free to pass upwardly thru the entire housing, due to the chimney effect. The housing 105 is provided with louvers 106 at an upper portion, through which the ventilating air may pass outwardly, and is provided with a top cover 107 attached by screws 108—108 having a large central opening at 109 out of which the ventilating air may also pass. The core 10 of the welding transformer is supported inside of the housing on cross frames 112 of angle iron. In every instance the several legs of which the core 10 is composed is made of two separate stacks, spaced apart by non-magnetic blocks. Thus the laminations are stacked up so as to form for example two half-thickness core portions 11'—11' provided as shown in Figure 7 and fixed non-magnetic spacer blocks 115 are placed between the two half-thickness stacks. The same is true for all other portions of the main and shunting sections of the core. It will be noted from Figure 6 that the spacer 115—115 is not one continuous piece but is separate blocks throughout the vertical height of the transformer spaced from each other end-to-end to provide openings 11X—11X thru which bolts 110—110 may conveniently be passed. In this way the laminations may be thought of as composed of two half-stacks separated from each other by the thickness of spacers 115 with bolts 110 passing thru to the laminations and spacers stacked together. Of course, for all legs of the core composed of laminations, there may be provided sturdy angles, as for example the angle 112 at the base which extends all the way across the transformer and connects directly to the frame, and constitutes a part of the frame. Similar clamping angles may be used as desired. The separated and spaced half-stacks thus provided at 11—11, 12—12, and 15—15 are in every instance composed of two separate stacks separated apart from each other.

In the instance of the legs 11, 12, and 15 the spacing apart is accomplished by the spacers 11s, 12s and 15s but in the instance of the leg 14 of the transformer the two portions 14—14 as shown in Figure 7 are held apart in another manner. Thus in the case of these stacks of laminations, there is provided for each stack a sheet metal angle 114—114 which also are composed of sheet steel. These angles are composed of the flanges 114A and 114B which overlap respectively the adjacent lamination adjacent space 115 (which in other legs of the core 10 is filled with the spacers). The outer flanges 114B seat against the edge face 14B of the stack of laminations. Angles 114—114 and the laminations of each portion of leg 14 against which the angles are placed are bolted in place between the bolts 115. The sheet metal angles 114A—114B can extend all the way up the top leg 12 of the core and down to the bottom leg 15 of the core. The metal angles serve to define a space 115 between them, in which the frame work pieces 21 and 22 (which support the primary arrangement 20), are adapted to operate up and down.

It will be noted that the heads of the bolts 115 are flattened so as to provide a maximum amount of space 115 thus to permit the frame work pieces 21 and 22 to operate freely.

Referring to Figures 6 and 7 particularly the upper framework piece 21 has an interior portion 21A which reaches across in the space 115. This framework 21 has corners at 21C and 21D which serve as seats upon which insulation 120 is provided for seating the upper end of the primary winding 23. Similarly, the framework 22 has a portion 22A which reaches across between the space 115 and likewise is provided with the corners 22C and 22D in which the insulation 122—123 is provided for supporting the lower end of winding 23. A plurality of bolts are provided at 124 which reach through portions 21A of the upper frame piece 21 and the portion 22A of the lower frame piece 22. When these bolts are tightened down the winding 23 is solidly supported by end pressure between the two frame pieces 21 and 22.

The upper and lower frame pieces 21 and 22 are apertured to receive a screw 26. The upper piece 21 is provided with an aperture at 21E which is sufficient to permit the upper threaded unthreaded end 26 of the screw rod to pass completely therethrough with clearance. The lower frame piece 22 is threaded at 22E to receive lower threaded end of the rod 26. The lowermost end of the rod 26 is turned down to a reduced diameter and is seated in a bushing 125 which is held in one of the spacing blocks of 15S between the core portions 15—15. This spacing block is of course held solidly in place by the bolts 110 which are provided at intervals for holding the laminations clamped together. At the top of the main magnetic circuit there are provided a pair of clamping angles 126—126 which are bolted together by the bolts 127—127 and these serve as a means not only of clamping upper portions 12—12—12S of the core structure together but also as a means of stabilizing the upper portion of the apparatus and providing frame support for a cross bearing plate 128 which is held in place by the bolts 129—129, which fasten to the angles. Centrally of cross plate 128 there is provided a bearing 130 which is of the thrust type, in which the upper end of the rod 126 is journaled. At the upper end of the rod there is provided a crank 29 covered by a pan 29A and a handle 29B. The pan is of sufficient diameter so as to cover the aperture 109 but is spaced vertically therefrom so that air can flow up through the aperture 109 and thence out under the rim of the pan. Whenever the handle 29B is turned the rod 26 will be turned and due to the screw threaded engagement with the lower frame piece member 22, the rod will accordingly raise or lower the entire primary arrangement structure 20.

Figure 4:
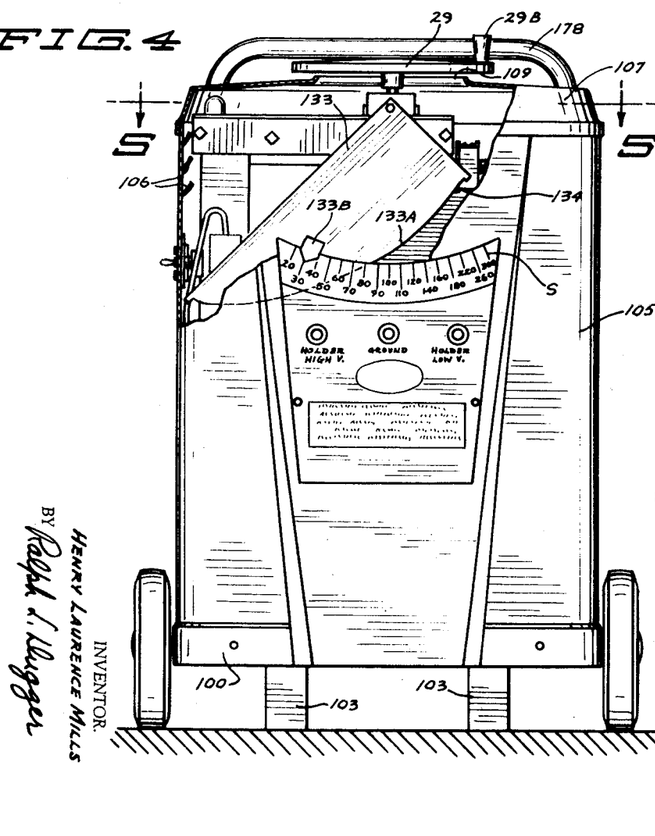
Figure 4 is a front elevational view of the welding transformer with the case partially broken away to show portions of the internal construction.
Figure 5:
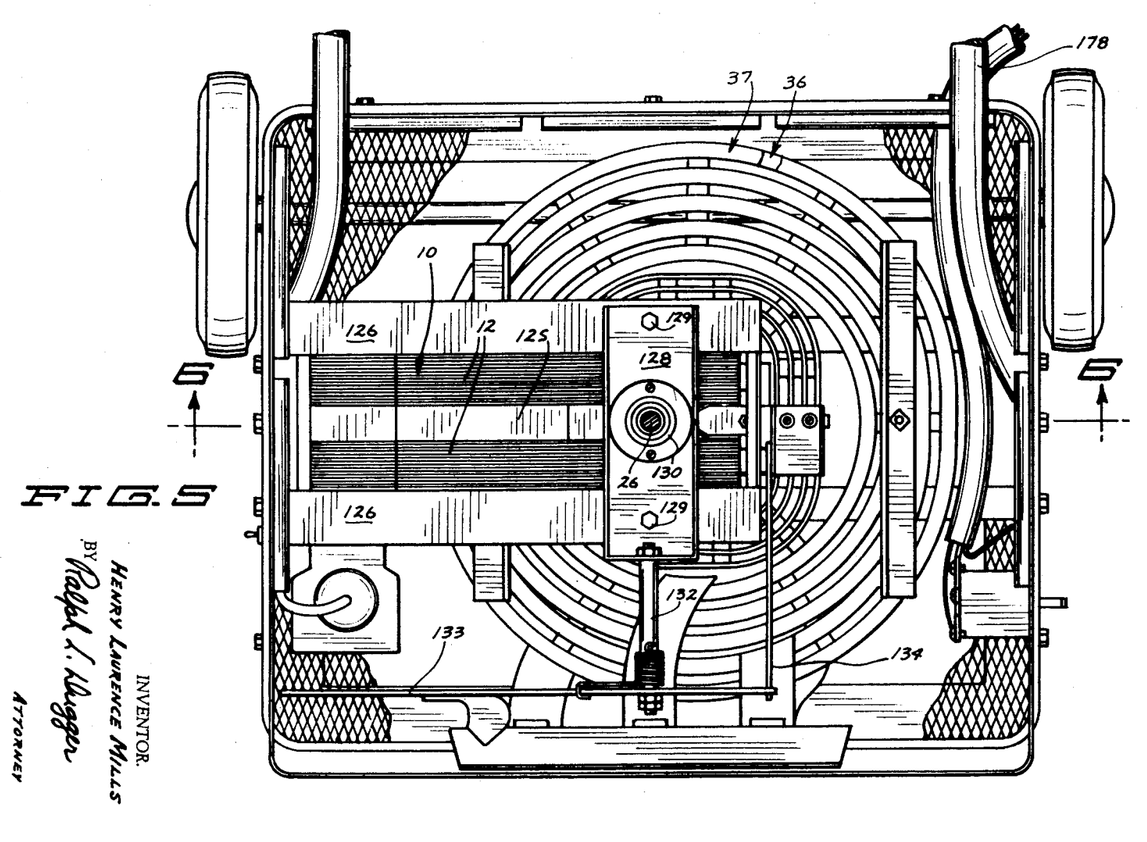
Figure 5 is a horizontal sectional view taken along the line and in the direction of arrows 5—5 of Figure 1.

Extending outwardly from the cross frame member 128 is a bearing rod 132 (see Figures 4 and 5) having journaled at its outer end upon which an indicator quadrant 133 is swung, said quadrant being provided with a cam edge at 133A. This quadrant 133 carries a pointer at 133B which extends out through an arcuate slot in the front of housing 105 so as to be in proximity with a scale upon which the welding apertures are parted. The primary arrangement 20 has a rod 134 extending out from the upper frame member 21 as shown in Figures 4 and 5. Rod 134 is adapted to ride against the edge 133A of the cam plate 133 and cause it to be rotated more or less depending upon the vertical elevation of the primary arrangement 20. In this way an indication is given on the front of the case which shows the vertical elevation of the primary arrangement 20, and the scale S is calibrated in welding amperages.

A smooth sliding movement of the main arrangement 20 up and down on the core portion 14—14—114—114 is achieved by means of the following arrangement: Referring to Figures 6 and 7 it will be noted that from the lower bracket 21 there is a downwardly extending ear 22E through which there is threaded a screw 140 which is locked in place by lock nut 141. The screw bears against a cross plate 142, and this cross plate is provided at its outer ends, see Figure 7, with a pair of bearing pads 144—144. These bearing pads are preferably faced with a plastic facing such as Teflon 145—145 the pad and plastic being held in place by a screw as shown. By adjusting the screw 140 more or less pressure can be placed upon the cross plate 142 and hence more or less pressure can be exerted by the pads 144 against the bearing flangings 144B and 114B of the angles which encase the outer edge faces of the laminations.

Also on the inside of the core, the lower frame piece 21 has a downwardly extending ear at 21F which serves as mounting upon which a piece of tough plastic facing 150 of Teflon or the like is attached. It will be noted from Figure 7, that the plastic layer generally designated 150 has portions 150A—150 which seat directly against the edges 14A of the laminations. The plastic is bent at the corners 150B—150B and extends to the left as shown in Figure 7 to corners 150C—150C and then straight across in contact with the ear 22F. A small channel 160 held in place by a plurality of more screws 161 clamps the plastic in place. The plastic sheet is thus very securely held and extends out and forms a bearing between the edges of the laminations in the half-stacks 30—30 (of the shunting circuit) and the adjacent laminations in the stacks 14—14, and the laminations of the two adjacent half-stacks thus held in close proximity, with the thickness of the plastic layer 150 forming in effect, an air gap in the shunting circuit 16—30. Thus even through the space 32 is quite closed at the beveled faces 18 and 31 a small and carefully controlled gap in the magnetic circuit (equal to the thickness of the plastic 150) is provided.

The adjustment of the screw 140 thus applying pressure upon the cross plate 142 and hence upon the pads 144 clamps the two portions 30 of the shunting circuit flatly against the plastic layers 150A—150A and which ride upon the face 14A composed of the edges of the laminations of the core 14. The laminations may cause some slight grooving of the plastic but this is not a disadvantage since this prevents any side slipping, once the device has been operated a short time and the adjustment 140 tightened.

At the upper end of the primary mechanical arrangement 20 the upper frame member 21 is likewise provided with an upstanding lug 21E which is provided with a similar screw 160 having lock nut 161 which bears upon the cross plate 162 which in turn presses the pads 164 against the outer faces of flank flanges 114B—114B of the core structure. The inner upstanding bracket 21F on the upper framework 21 bears against a crossbar 165 which is provided with at each of its opposite ends with a pad 166 similar to those at 164. Thus by adjusting the screw 160 the pad 166 bearing against the inner face 14A of the laminations and pads 164 bearing against the outer flanges 14B of the lamination structure can be brought into carefully regulated pressure engagement with the lamination structure and thus the upper portion of the primary structure 20 is stabilized against the vibration or wobbling. In this way the entire primary arrangement is very adequately supported upon the leg 14—14 of the core structure 10 and this can be done without any substantial vibration being exhibited. This is a considerable advantage because it permits wide latitude in adjustment of the position of the primary 20 without noticeable vibration or humming.

The support of the secondary coils 36—37 is upon insulating cross blocks 170—170 under the lower coil 3. Spacer cross blocks are provided at 171—171 and through bolts 172 extend upwardly through spacings between the turns of the secondary coils and across the top of the upper secondary coil 37 or laid on the angles 173—173 through which the upper end of the bolts 172 extend. Preferably springs are provided at 175—175 about the upper protruding ends of the bolt and the spring is held down by the nuts 176. In this way a constant pressure is maintained upon the windings 36—37 even though there may be some change in dimension due to variation in heating of the winding.

As many changes may be made in the illustrated constructions and many apparently widely different embodiments of the invention may be made without departing from the spirit and scope thereof, it is intended that all matter contained in the above description or shown in the accompanying drawings shall be interpreted as illustrative and not in a limiting sense.

What I claim is:

1. A welding transformer comprising a closed loop core of magnetically permeable metal having a straight section, a secondary coil encircling said straight section and fixedly located at one position of the length thereof and a mechanical support mounted on said straight section for translatory movement, a main primary coil encircling said straight section and mounted on the mechanical support so as to be movable therewith toward and away from a position proximate said secondary coil, a supplemental primary coil encircling a portion of the magnetic circuit mounted closely adjacent the secondary coil, said supplemental primary coil being connected so as to produce a magnetomotive force produced by the additive in respect to the magnetomotive force produced by the said main primary coil and a voltage responsive circuit controller connected in the circuit of the supplemental primary coil for controlling the application of power thereto, said voltage responsive circuit controller being connected to the secondary coil outlet so as to be responsive to the output voltage thereof and so as to close the circuit to the supplemental primary when the secondary coil voltage reaches substantially open circuit terminal voltage.

2. A welding transformer comprising a closed loop core of magnetically permeable metal having a straight section and a remote return section forming a closed loop with said straight section, said straight section being sufficiently rigid mechanically to form a post slide, a secondary coil encircling said straight section and fixedly mounted near one end of said straight section, a slide frame mounted for sliding movement on said straight section, a main primary coil mounted on the slide frame in a position so as to be movable toward and from a position proximate the secondary coil when the frame slides on the straight section, a shunt forming a shunt path extending from the remote return section to the straight section, said shunt being composed of at least two shunt portions of magnetic material serially connected, at least one of the shunt portions being mechanically supported on the slide frame and located so as to be proximate another of said shunt portions so as to form a shunt path of minimum magnetic reluctance when the frame is moved on the straight section for positioning the main primary coil remotely in respect to the secondary coil, and to space said shunt portion when the frame is moved on said straight section for positioning the main primary coil proximally said secondary coil, a supplemental primary coil encircling a portion of the magnetic core forming the magnetic circuit through the secondary coil and the shunt, said supplemental primary coil being connected in additive relation in respect to said main primary coil, and circuit control means connected in the circuit of said supplemental primary coil and connected to the output of the secondary coil so as to be responsive to the output voltage thereof for closing the circuit to the supplemental primary coil when the output voltage of the secondary coil approximates open circuit voltage for opening the circuit of the supplemental primary coil when the output voltage of the secondary coil is lowered by flow of welding current therethrough.

References Cited in the file of this patent

UNITED STATES PATENTS

| | | |
|---|---|---|
| 1,368,507 | Kjekstad | Feb. 15, 1921 |
| 2,471,222 | Lorant | May 24, 1949 |
| 2,475,044 | Mulder | July 5, 1949 |
| 2,572,455 | Dunn | Oct. 23, 1951 |
| 2,597,689 | Welch | May 20, 1952 |

UNITED STATES PATENT OFFICE

CERTIFICATE OF CORRECTION

Patent No. 2,931,967                      April 5, 1960

Henry Laurence Mills

It is hereby certified that error appears in the printed specification of the above numbered patent requiring correction and that the said Letters Patent should read as corrected below.

Column 1, line 55, for "invent" read -- invention --; column 5, line 49, for "drawn" read -- draws --; column 7, line 2, for "laminnations" read -- laminations --; column 8, line 1, for "through" read -- though --; line 50, for "winding" read -- windings --.

Signed and sealed this 13th day of September 1960.

(SEAL)
Attest:

KARL H. AXLINE
Attesting Officer

ROBERT C. WATSON
Commissioner of Patents